United States Patent
Goldthwaite et al.

(10) Patent No.: US 7,363,591 B2
(45) Date of Patent: Apr. 22, 2008

(54) ELECTRONIC PROGRAMMING GUIDE SYSTEM AND METHOD

(75) Inventors: Flora Goldthwaite, Seattle, WA (US); Immaneni Ashok, Bellevue, WA (US); David William Baumert, Sammamish, WA (US); Jonathan C. Cluts, Sammamish, WA (US); Sven Pleyer, Woodinville, WA (US); Pamela J. Heath, Seattle, WA (US); Aaron Woodman, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 704 days.

(21) Appl. No.: 10/348,591

(22) Filed: Jan. 21, 2003

(65) Prior Publication Data

US 2004/0140995 A1 Jul. 22, 2004

(51) Int. Cl.
G06F 3/00 (2006.01)
G06F 9/00 (2006.01)
G06F 17/00 (2006.01)

(52) U.S. Cl. ............... 715/763; 715/835; 715/967; 715/839; 715/838; 715/762; 715/764

(58) Field of Classification Search ........... 715/762, 715/763, 764, 838, 835, 839, 967, 976, 977
See application file for complete search history.

(56) References Cited

U.S. PATENT DOCUMENTS

| | | | | |
|---|---|---|---|---|
| 5,912,664 A | | 6/1999 | Eick et al. | |
| 6,037,933 A | * | 3/2000 | Blonstein et al. | 715/721 |
| 6,064,383 A | * | 5/2000 | Skelly | 715/758 |
| 6,637,029 B1 | * | 10/2003 | Maissel et al. | 725/46 |
| 6,642,939 B1 | * | 11/2003 | Vallone et al. | 715/721 |
| 6,665,870 B1 | * | 12/2003 | Finseth et al. | 725/40 |
| 6,728,967 B2 | * | 4/2004 | Bennington et al. | 725/43 |
| 6,832,385 B2 | * | 12/2004 | Young et al. | 725/39 |
| 6,993,782 B1 | * | 1/2006 | Newberry et al. | 725/39 |
| 2001/0012020 A1 | | 8/2001 | Stautner et al. | |

(Continued)

OTHER PUBLICATIONS

Brugliera, "Digital On-Screen Display a New Technology for the Consumer Interface," Symposium Record Cable Sessions, 18th International Television Symposium and Technical Exhibit, Jun. 10-15, 1993, pp. 571-586, Montreux Switzerland.

(Continued)

*Primary Examiner*—Stephen Hong
*Assistant Examiner*—Anita Datta Chaudhuri
(74) *Attorney, Agent, or Firm*—Shook, Hardy & Bacon LLP

(57) ABSTRACT

The present invention is directed to a method and system for use in customizing, organizing and presenting digital information for selection and interaction by end users. The present invention conveys multiple pieces of information to a user in a multi-dimensional metaphor. A user is presented with a selection of content options that are catered to the user. Presented information is filtered on the basis of configurable user criteria, wherein the criteria includes both what is represented and how it is presented, as it relates to current and past user choices of content. The present invention also presents ancillary information that is associated with the digital content. Additionally, the present invention provides user interface features directed to content from a variety of media, including on air, video, photos, music, games and books.

23 Claims, 6 Drawing Sheets

U.S. PATENT DOCUMENTS

| | | | |
|---|---|---|---|
| 2002/0010929 A1* | 1/2002 | Collier | 725/40 |
| 2002/0054062 A1* | 5/2002 | Gerba et al. | 345/716 |
| 2002/0133820 A1* | 9/2002 | Arai et al. | 725/46 |
| 2003/0088872 A1* | 5/2003 | Maissel et al. | 725/46 |
| 2003/0115603 A1* | 6/2003 | Lemmons et al. | 725/53 |
| 2003/0163814 A1* | 8/2003 | Hayakawa | 725/45 |
| 2004/0194136 A1* | 9/2004 | Finseth et al. | 725/39 |
| 2004/0210931 A1* | 10/2004 | Gordon et al. | 725/39 |

OTHER PUBLICATIONS

European Search Report dated May 19, 2004, Application No. EP 03 02 9938.

* cited by examiner

EMOTICONS WITH FX
FOR PC AND TV ACTIVE AND INACTIVE STATES

| | | | | | |
|---|---|---|---|---|---|
| 1 | | ACTIVE | 2 | | $$$ |
| 3 | | HIGH DEF | 4 | | NOTES |
| 5 | | NEW | 6 | | ALERT |
| 7 | | RASPBERRY | 8 | | HAPPY |
| 9 | | NOT GOOD | 10 | | SAD |
| 11 | | MAD | 12 | | VIDEO |
| 13 | | TEXT | 14 | | VOICE |
| 15 | | NEW MESSAGE | 16 | | ENHANCED |
| 17 | | APPOINTMENT | 18 | | BIRTHDAY |
| 19 | | CD/I OWN | 20 | | ONLINE |
| 21 | | CONTRACT | 22 | | LIVE |
| 23 | | MEDIA | 24 | | MULTIPLE COMM PREFERENCES |
| 25 | | INTERACTIVE | | | |

FIG. 5.

ELECTRONIC PROGRAMMING GUIDE SYSTEM AND METHOD

CROSS-REFERENCE TO RELATED APPLICATIONS

None.

TECHNICAL FIELD

The present invention relates to computing environments. More particularly, the invention is directed to a system and method for organizing and presenting digital information for selection, notification, informational viewing and interaction by end users. The present invention filters, sorts and displays digital content and other information associated with digital content, to enable user programming and organized access.

BACKGROUND OF THE INVENTION

With electronic programming guides, individuals are plagued with a wide variety of information from a multitude of sources. The decision on what to watch, listen to or interact with can become quite cumbersome particularly in light of the fact that all of the various information sources present information at different times. For example, traditional media information is available on a time and channel basis only. In other words, because the typical source of Audio-Visual entertainment is not owned by a content participant, a participant can only enjoy such information live or for a fixed time portion. As such, the availability of the entertainment is usually published with a specified channel or location where the information will be available, along with some indication of the time period during which the information is available.

If an individual intends to participate in a particular media event, the individual must locate the appropriate channel/location at the allotted time, as set by the service that is providing the content. For example, locating a particular event of interest would require a search by the individual. A search can involve multiple time slots, which could mean days, weeks or months of content presentation programming must be sifted through in order to locate the event of interest. In the alternative, the individual may purchase media that contains the content programming of interest, so that it can be experienced at the individual's leisure. Either of these options can become daunting, considering the vast quantities and formats of movies, music, books and other content programs that exist in digital form. Conversely, one of the drawbacks of the purchase option is the fact that the content media may or may not be available for purchase at the moment of the intended participant's interest. For example, there is the initial cost of the medium and the additional costs associated with storing the medium among other things. Yet another drawback is the fact that an individual must potentially rely on their memory or an extensive cataloging system of some sort to determine if they own a particular content program and where the program is located.

Aside from the multiple forms of content programs, there is also a vast variety of sources even for similar content types. For example, Kansas City Jazz music content is available on cable TV, music CD's, the internet and live at local establishments. There is no single unified presentation of multi-source content programming. Locating content from various sources requires a user to consult multiple programming guides. It is tedious at best, for a user to coordinate participation in multi-source events. Returning to the previous example, assume an individual was interested in experiencing two performances of a particular jazz artist, one live and the other on cable television. The individual must locate various catalogs, magazines and schedules to determine the where and when. Then the individual must plan accordingly. This task becomes even more cumbersome when multiple events by multiple artists are considered.

Even when the appropriate information source is located, the presentation of content availability and schedules is limited. For example, in the case of movies, television shows or radio broadcasts, a title and show time are primarily the only information that is readily available to a user. In order to find out any other details regarding an event, the user must turn to other information sources. There is no information source that provides or conveys multiple pieces of content information simultaneously to a would be content participant. There is no multi-dimensional presentation of content programming. A multi-dimensional presentation of content enables the user, the content itself, or a service or template to provide/help set the criteria of what is presented. In other words, currently available systems and methods for conveying content programming can be thought of as being two-dimensional, that is they provide a channel and a time dimension.

In another aspect of content programming, the delivery or user experience of any content programming is generally limited to one or two devices within the user's space. For example, when watching a movie at home, the user's experience is delivered by the display system and perhaps a stereo system. Such delivery does not fully utilize the potential of other devices within the home, nor does it take advantage of the connectivity and communications that are available between hardware and software devices within the home.

In light of the foregoing, there exists a need to provide a system and method that will enable more convenient presentation of digital content, from multiple sources preferably in a manner that is flexible, consistent and adapted to the preferences of the end user.

SUMMARY OF THE INVENTION

The present invention is directed to a method and system for to customize the presentation, selection and delivery of multi-faceted digital content.

In one aspect, the present invention is directed to enabling a content participant to be presented with a selection of content options that are catered to the participant.

In another aspect, the present invention utilizes filters for organizing and presenting programming and content information based on any of a number of possible user-defined criteria, wherein the criteria includes both what is represented and how it is presented.

In a further aspect, the present invention is directed to presenting organized content materials with additional indicia of associated meta-data, to convey multiple pieces of information about the content materials.

The present invention is directed to a system and method for presenting digital information, for selection, informational viewing and interaction by end users. The present invention filters, sorts and displays digital content. The present invention also presents ancillary information that is associated with the digital content. Additionally, the present invention provides user interface features directed to content from a variety of media, including on air, video, photos, music, games and books. As previously indicated, the present invention is equally applicable to any digital content.

The present invention is directed to a method and system for use in customizing, organizing and presenting digital information for selection and interaction by end users. The present invention conveys multiple pieces of information to a user in a multi-dimensional metaphor. A user is presented with a selection of content options that are catered to the user. Presented information is filtered on the basis of configurable user criteria, wherein the criteria includes both what is represented and how it is presented, as it relates to current and past user choices of content.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means, instrumentalities and combinations particularly pointed out in the appended claims.

BRIEF DESCRIPTION OF THE SEVERAL VIEWS OF THE DRAWING

The present invention is described in detail below with reference to the attached drawings figures, wherein:

FIG. 5 is a listing of exemplary emoticons utilized in the present invention.

DETAILED DESCRIPTION OF THE INVENTION

Figure 1:
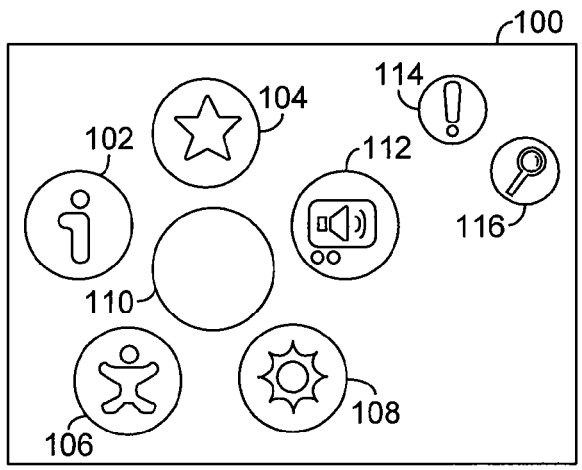
FIG. 1 is an illustrative screen display for user interaction, in an embodiment of the present invention.

The present invention is directed to a system and method for presenting digital information, for selection, informational viewing and interaction by end users. The present invention filters, sorts and displays digital content. The display of digital content can be on the basis of a criteria associated with a participating user or on the basis of the elements of the content itself. The present invention also presents ancillary information that is associated with the digital content. The present invention is applicable to any set of digital content whether or not the elements of the content are related. Examples of content lists include people/contact, shopping, notifications, inventory, materials, media and essentially any collection. In the preferred embodiment of the present invention, media content is presented for selection, informational viewing and interaction by end users. Additionally, the present invention provides user interface features directed to content from a variety of media, including on air, video, photos, music, games and books. For each of the media varieties there are additional features that are also handled by the present invention and these will be discussed below.

Features such as material guides, viewing history, recommended content, user requests, new content and community information are included and accessible by a user, for each media type. Material guides provide access and information relating to content materials of interest such as, titles, availability and location. Viewing history, as the name suggests, provides information on the media content that has been previously viewed. Recommended content is a feature that suggests media content to a user on the basis of prior user access to the media source. The user request feature functions to receive and display active selections made by the user. New content refers to newly acquired or recently identified content materials. Community information refers to a feature that enables a participant to discover both the presence and identity of other participants who are concurrently engaged with the same media event. For example, when a user is watching a particular show, the user is able to determine which persons within a previously defined group of friends is also watching the same show.

The look and feel for participant interaction and presentation of content is consistent between a computer system and other display media such as a television in the present invention. In either environment, a user is presented with options and information that are consistent with what the user would want to have available. In other words, there is a consistent interface presented to a user for access to all digital information, regardless of the presentation device or the underlying media content. Furthermore, the choices of presented content material are dictated by the participant's historical content preferences or specific current content selections.

In particular, the present invention provides to a user a multi-dimensional display guide for accessing digital content. Users or media participants as they are referred to herein, are able to obtain several items of information relating to content materials from a display of content choices. In other words, the displayed choices of content include and facilitate access to other information relevant to the content. For example, the display of a music album title includes and provides access to the ability to play the album, view information about the tracks, the singer, upcoming concerts by the singer, similar music from other artists and so on. These content materials and relevant information are captured live, dynamically and on demand rather than being of a static nature. For instance, in the case of the previously discussed music album, the time and date of a displayed upcoming concert that is accessible or shown in connection with the music title will change in accordance with any real time external changes to the concert schedule. Content choices that are presented to a participant are a function of the participant's preferences. A participant's preferences are determined by historical access of content or manipulation of other criteria specified by the participant.

A participant's preference results in a filtering, sorting and grouping of content titles, for display to the participant. For example, assume that a participant elects to receive information on books. A list of titles and authors of books that are electronically available would be displayed. The displayed list is qualified by the system and method of the present invention. The list of available books for example, is filtered by the participant's historical preference and possibly also by any currently stated preferences of the participant. Filtering can be based on any of a number of criteria including genre, author, ratings and so on. The list is further sorted and grouped by the stated preferences for display to the participant. For each of the displayed book items, associated ancillary information may also be simultaneously displayed or directly accessed by the participant. For example, by selecting to view additional information, a participant could access book reviews, number of book copies sold and other ancillary information. Such additional information can also include a brief autobiography of the author, publisher information, similar book topics from other authors and so on.

Having discussed features of the present invention, an embodiment of the invention will be discussed with reference to FIGS. 1-5, wherein a participant's interface and user display illustrate the features discussed above.

In one aspect, the present invention is directed to a computer readable medium having computer executable code for performing a method for presenting digital content. The method includes providing a selection of one or more content material from one or more sources and grouping and sorting the one or more content material on the basis of one or more user configurable criteria. The method further includes presenting the one or more content material along as icons and presenting associated meta-data as emoticons to convey multiple items of information for selection by a user.

In another aspect, the present invention is directed to a computer system having a processor, a memory and an operating environment, the computer system operable to execute a method for presenting digital content. The method includes providing a selection of one or more content material from one or more sources and grouping and sorting the one or more content material on the basis of one or more user configurable criteria. The method also includes presenting the one or more content material and presenting associated meta-data as emoticons to convey multiple items of information for selection by a user.

Further, in another aspect, the present invention is directed to a computer readable medium having computer executable code for performing a method for the consolidated display and presentation of digital information for interaction by a participant. The method includes providing one or more content material from one or more content sources and organizing the one or more content material on the basis of one or more configurable criteria. The method also includes presenting the organized one or more content material with an indicia and at least one associated meta-data for consumption or further use by the participant, wherein the one or more configurable criteria is at least one of the historic pattern of access and selection of media content by the participant and the similarity of the one or more media content to a current selection of content by the participant.

In yet another aspect, the present invention is directed to a computer system having a processor, a memory and an operating environment, the computer system operable to execute a method for the consolidated display and presentation of a digital information for interaction by a participant. The method includes providing one or more content material from one or more content sources and organizing the one or more content material on the basis of one or more configurable criteria. The method also includes presenting the organized one or more content material with an indicia and at least one associated meta-data for consumption or further use by the participant, wherein the presented associated meta-data is an emoticon and wherein the one or more configurable criteria is at least one or the historic pattern of access and selection of media content by the participant and the similarity of the one or more media content to a current selection of content by the participant.

With reference to FIG. 1, an exemplary interface for the present invention is illustrated and generally referenced as Display 100 as would be seen on a television screen. In contrast to traditional programming guides or other presentations of available media content, the illustrated Display 100 provides multiple options and conveys several pieces of information simultaneously to a participant. As shown, a group of icons 102-116 provide information regarding categories, identity mode, notification and search. Categories refer to the interactive options that are available to a participant, such as Information Icon 102, Main Icon 104, People Icon 106, Environment Icon 108, Identity Mode Icon 110 and Media Icon 112. These group of options in an embodiment of the present invention, form a Navigation Ring.

Information Icon 102 can provide a display of general purpose information. Main Icon 104 displays the main menu of options available to a user. People Icon 106 can provide access to options for adding or removing users and so on. Environment Icon 108 provides access to system look and feel options. Identity Mode Icon 110 provides access to individualized information about system users. The functions associated with each of the icons are exemplary and are not intended to be limited to the described functions. Other combinations and permutations of optional functions can be implemented by icons without departing from the scope of the present invention. When any of the Categories or Identity Mode Icons 102-112 are selected, the associated sphere expands to expose the related content. An example of this is shown in Display 200 of FIG. 2A, which illustrates the effect of a user having selected the Media Icon 112.

The media sphere is expanded as shown, to reveal a Guide 202 that contains available Media Content 204A-204K. The Guide 202 additionally conveys information relevant to the displayed Media Contents 204A-204K.

As shown, the view of Media Content 204A-204K can include other Emoticons 206, 208 or Descriptive Text 210, all of which serve to convey information relating to the Media Content 204A-204K. Emoticons 206, 208 as used herein, refer to a pictorial icon that represents a predefined meaning or qualities within the context of an associated digital content. Such qualities can include 'never been viewed', 'new', 'fee per use', 'high definition', 'rating' and so on. An exemplary but non-exhaustive list of Emoticons 1-25 are shown in FIG. 5. For example, the Emoticon 206 of FIG. 2A indicates that the Olympic sports special, represented by Icon 204H, which will be shown on ESPN, requires a contract. Another example, is Sports Live episodes represented by Icon 204I and qualified by Emoticon 208. The Emoticon 208 indicates that the show will be a live broadcast. Other types of information regarding the media content of the 'our shows'Guide 202 of the Media Sphere 112 can also be conveyed in the Display 200.

Figure 2A:
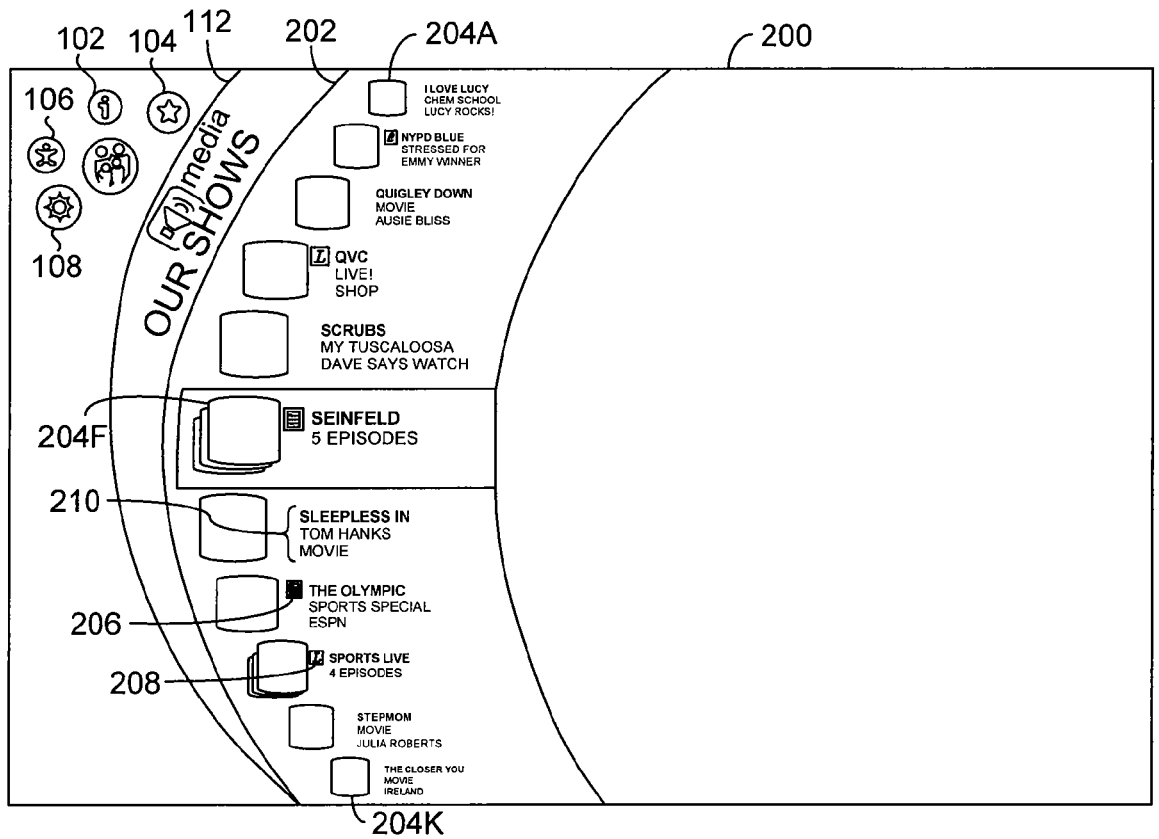
FIG. 2A is an illustrative screen display of a television user interface of icons to access available shows and multiple list items.
Figure 2B:
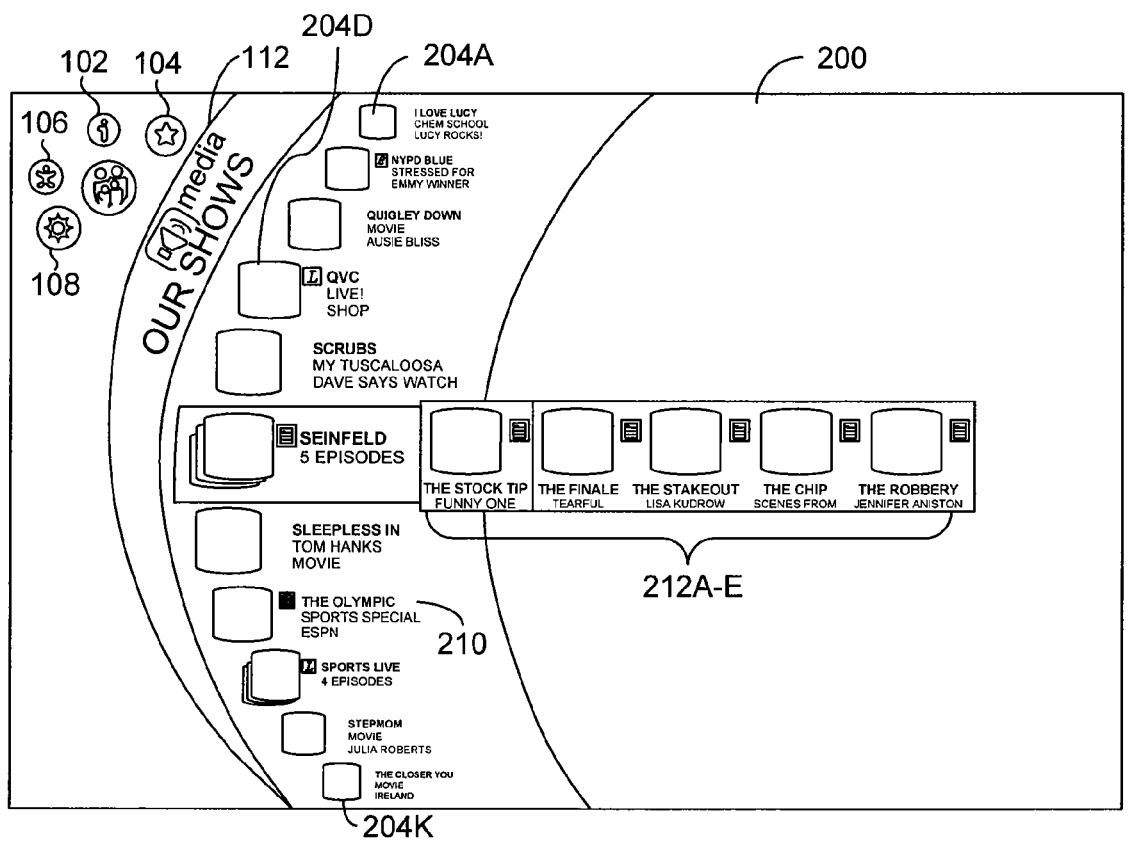
FIG. 2B is an illustrative screen display of the television user interface of FIG. 2A, wherein one of the multiple list item collections has been expanded to reveal other icons.

The stacked display of Media Content 204F for example, conveys the fact that Content 204F is a multiple list item collection. This means that when the Media Content 204F is selected, the participant is able to view additional contents within the collection. This scenario is illustrated in FIG. 2B, wherein Media Content 204F is expanded to reveal the Collection Content 212A-212E. As in the case of the Icons 204A-204K, the Collection Contents 212A-212E, can also be individually qualified with emoticons to convey additional information about the individual Collection Content 212. In this scenario, Media Content 204F is a stacked display, thus indicating a multi-list item. In particular, Media Content 204F is a collection of 5 episodes of a 'Seinfeld' show. When the collection is selected by a participant, an expanded list containing each of the 5 episodes, i.e. Content Collection 212A-212E, is displayed and accessible by the participant. From this view, the participant can obtain information specific to each episode or view the episode.

It should be understood that the displayed Content Icons 204A-204K of the Guide 202, are presented on the basis of the participant's preference. In other words, the system and method of the present invention selectively presents content material by utilizing participant specific criteria. For example, in accordance with earlier discussions, the QVC Shopping Icon 204D among other icons, is presented because the participant has viewed or accessed that station in the past. Conversely, it could be that the participant has made other content selections which would suggest that the QVC Icon 204D is appropriate for inclusion in the Guide 202.

The presentation and display metaphor of the present invention is also applicable to a personal computer (PC) environment. An example of a PC user interface, is illustrated as Display 300 of FIG. 3A, and is similar to Display 200 of FIG. 2A. The PC Display 300 includes Content Icons 306A-306I, Descriptive Text 308, emoticons, 'View By' Icon 302 and a Location Icon 304. For the most part, despite the difference in operating environment, the user interface operates and conveys information in a consistent manner. Some additional user options are illustrated in the user interface of FIG. 3B. A multi-dimensional presentation of content enables the user, the content itself, or a service or template to provide/help set the criteria of what is presented. For example, the 'View By' Icon 302, a Notification Icon 114, a Search Icon 116 and the Location Icon 304 are displayed and accessible in the PC embodiment by a participant. The 'View By' Icon 302 enables a participant to interactively alter the appearance of the display by specifying how the content items 306A-306I will be displayed to the participant. For example, each of the content items 306A-306I can be displayed as list items, icons, or they may also be displayed in a format that allows other content details to be simultaneously viewed by the user. Examples of these views can be seen in FIG. 4A-FIG. 4D. Additional options of an embodiment of the present invention in the PC environment exemplify the versatility of the present invention, such as notification, searching and filtering.

Figure 3A:
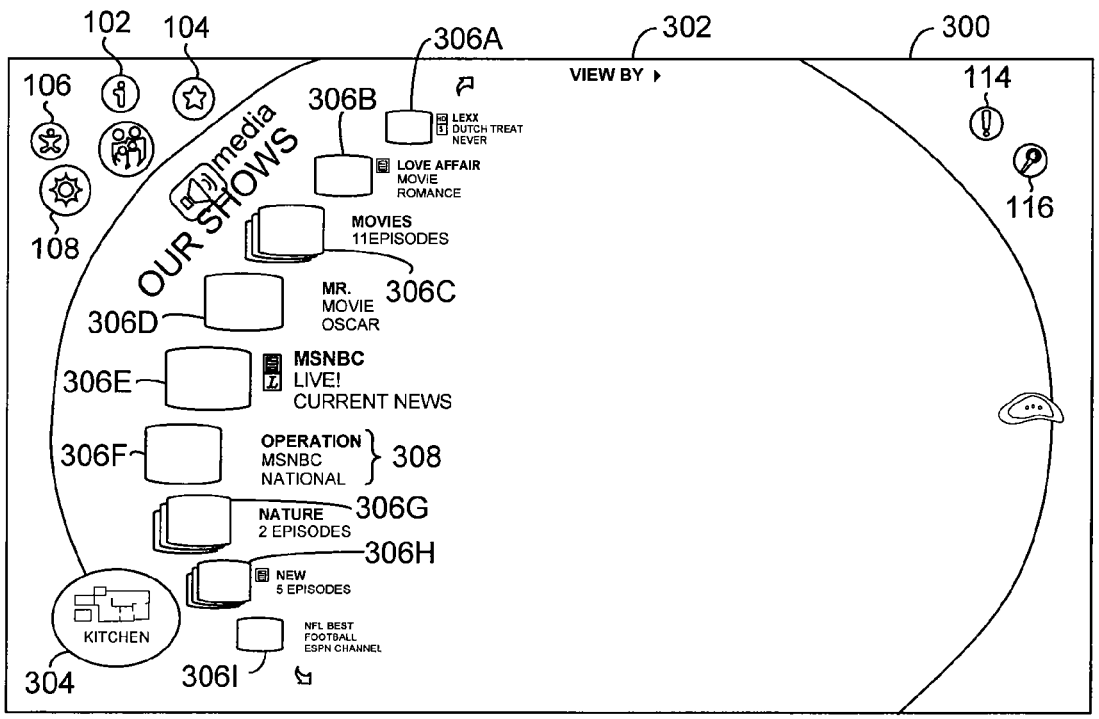
FIG. 3A is an illustrative screen display of a personal computer user interface with show icons and detail list views of emoticons.
Figure 3B:
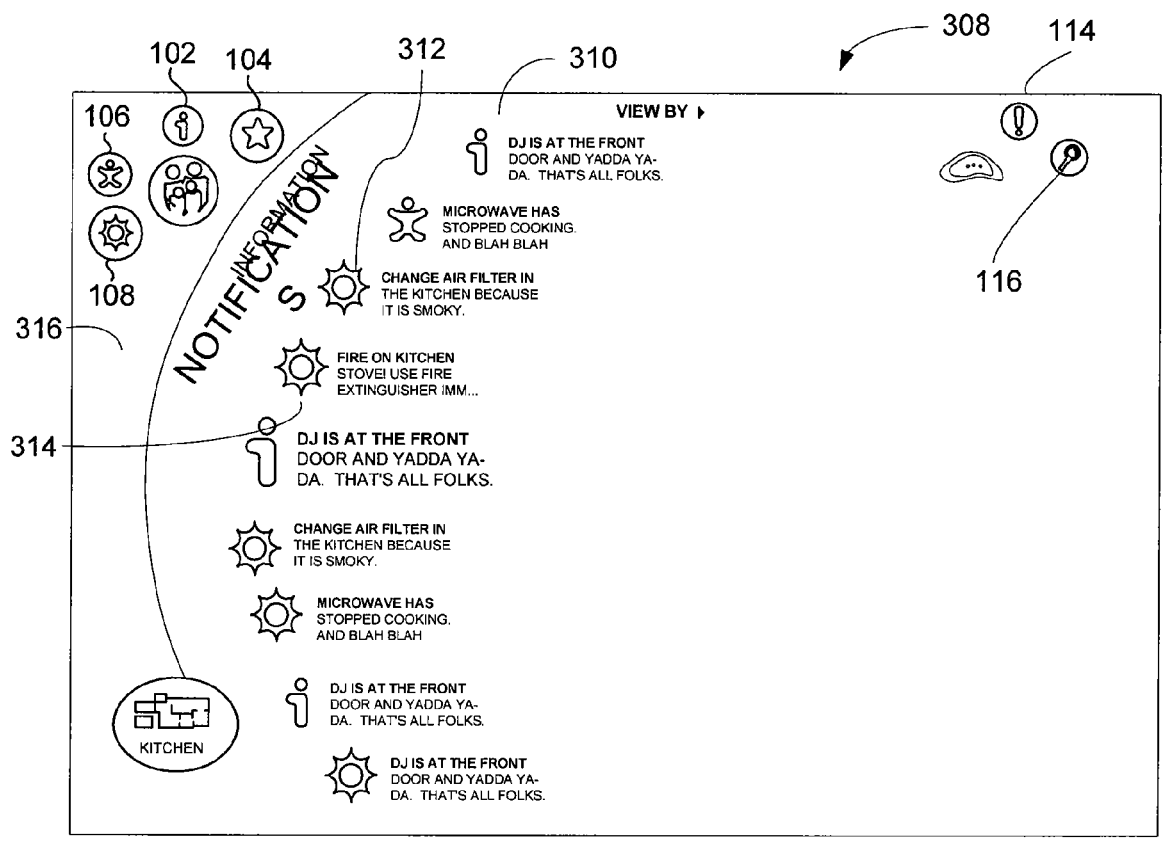
FIG. 3B is an illustrative screen of the information notification sphere of the present invention.

Notification Icon 114 provides access to user interface notification components, such as a notification log, priority levels for notifications and targeted notifications. Notifications can be initiated from many sources, including the user interface of Display 300 and other devices within a home, office or other environment of the presentation system. The notifications are visually distinct for the source and the various available types. For example, targeted notifications vary according to priority. A targeted notification, for example, is the arrival of a new mail message for a particular recipient. The priority is dynamic and based on the intended recipient, the current activity of the recipient, and the source device of the alert. As such, for example, mail notification could come across in different colors on a display accompanied with sound effects or cause the interruption of some user activity. An Exemplary Notification Sphere 316 that results from the application of the system and method of the present invention, is shown in FIG. 3B.

Targeted notifications presented in this example include Icons 310, 312 and 314. As previously discussed, each of these notifications can be visually distinct and prioritized for an available type. For example, Icon 310, which indicates that DJ is at the front door looks very different from Icons 312 and 314, which provide notifications relating to a status in the home. While not readily as apparent in the illustrated black and white screen shot of FIG. 2B, Icon 312 relating to the need for a filter change is presented in a less noticeable color (indicative of a lower priority) than Icon 314, which is providing notification of a fire on the kitchen stove. As would be understood by persons skilled in the art, these notifications can also be provided to other systems and devices throughout the home as appropriate including visual and audible devices, telephonic devices, alarm systems and so on.

Search Icon 116 of FIG. 1 provides a full text search of all elements within the system. This includes all static user interface pages as well as content for dynamic pages such as television programs and email messages. Selection of the Search Icon 116 displays search interface components and features. Search components include entry fields, a scope picker, a scope filter and a sorter with the ability to sort search results. The scope determines the content that the user is searching through and whether such search is based on content attributes or historical access. For example, the content scope can include the following—Internet, all categories, current category (main, media, environment, people and information), sub-category (media guides—on air, movies, music, environment, people and information). Once a scope is identified, certain search rules must then be applied to further narrow the search. These can be applied through a search filter.

The search filter determines the how and what with regards to the search rules for the scoped information. In other words, the scoped content may be further qualified by the definition of the filter. For example, if a search is performed based on what functions are available to a particular participant, the content scope may include persons, location, device, possibly task and history. A specified search filter could then cause the system to search specific collections of personal choices, location specific choices and so on. In another example, a filter may be guided by a user's request to filter content and only display Parental Guidance (PG) and below rated movies that are no older than 5 years and organize the filtered list based on genre and then recommendations. This list could also be further filtered again by location and device thus allowing only educational programming on the children's PC. In any case, the filtering process culminates in a search result set.

The search result set contains information on content materials such as title, description, location and time. Results are displayed in association with particular content. Results are also displayed in context with the category within which the result resides. For example, a search result for all content related to an artist 'DMB' to which a participant has rights, could yield a litany of materials. Such materials can include 'DMB' as a person with his picture and a link for contact information. A related music search could yield an album cover and a play button. Videos would include a cover and play button. Interview would include picture, date and length. Even past and future concert events could be included. Essentially, a vast amount of related material will be located. A search result sorting may then be desirable.

The sorting includes groupings by participant/related content, devices for rendering the content, actions and other content categories such as, media, information and environment. There are infinite ways in which to filter, sort and manipulate the content of the present programming guide. Processes may vary based on specific criteria such as x number of programs from column A, y number from column B and so on. In some cases user habits, preferences and viewing history can also impact the sort. Even further, the availability of hardware devices to enhance an experience could also factor into the sort. For example, based on preferences, a higher priority may be set to media content that is high definition and has surround sound capabilities if there is the hardware to support it. The resultant information set regardless of the sort can then be presented to the participant.

The presentation to the participant is then dictated by a number of elements in addition to the type of presentation device. In particular, elements that factor into the presentation include screen size, hardware devices such as keyboard, mouse, remote control and touch sensitive devices. Other elements include the distance of the participant to the display, the task being performed by the participant and other things that may be occurring within the environment.

Location Icon 304, illustrates a floor plan of the locale within which a user is operating (e.g., a floor plan of a home). Selection of the Location Icon 304 animates, grows and overlays the floor plan transparently over a content sphere. This sphere includes an identification of a room, an indication of the room's position within the plan, and numerous status icons. Status icons can include an indication that communication is taking place, that media are playing, lights are on or the presence of people within the room.

A variation of the Expanded Media Sphere 112 of FIG. 1 is shown in FIGS. 4A-4D. As previously discussed there are several options of digital content that can be portrayed by the present invention. In the case of media content, options include music, video, photos, games, or 'on air' programs. For each of these media, a plurality of actions or tasks can be performed by a user. Such actions include selecting menu items and sub-items such as music, where a play list guide is displayed. Other actions include viewing a guide as a list or a grid; navigating through a list by scrolling; clicking on content in a list to select the content, or in some cases previewing the content; sorting and grouping lists; selecting interactive options; and changing personal settings such as preferences. A few of these and other actions will be discussed further with reference to each of the figures.

Figure 4A:
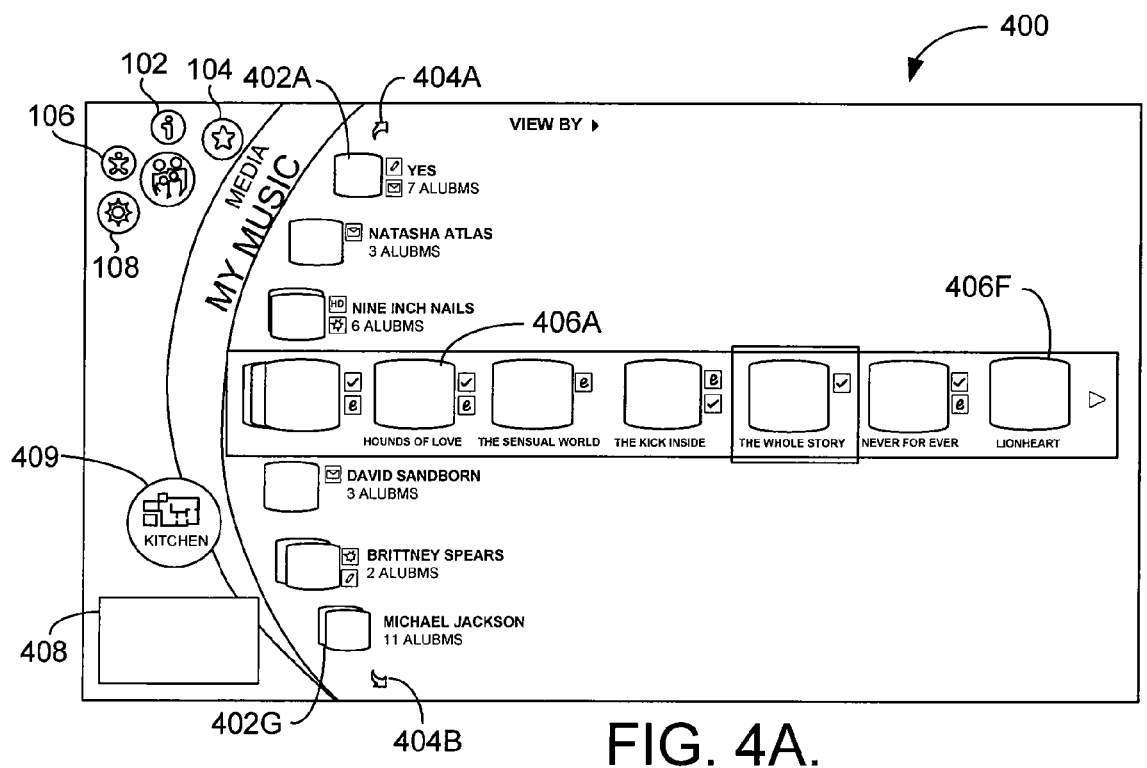
FIG. 4A is an illustrative screen display of a television user interface of music programs with an expanded multiple list item collection of albums.

Display 400 of FIG. 4A is very similar in appearance and function to Display 200 of FIG. 2B with a few exceptions. The Display 400 illustrates a music media sphere along with a Picture-In-Picture (PIP) Area 408 in a TV user interface. In addition, Display 400 also includes a Location Icon 409. A show is displayed in PIP Area 408 when a participant is watching the show prior to selecting the music media sphere. The music media sphere includes music content Display Icons 402A-402G, an Expanded Multi-List 406 and Scroll Icons 404A, 404D. The presentation and programming metaphor of the present invention presents a participant with the ability to choose any one of a number of musical content by selecting the associated Display Icon 402A-402G. The selection of any of the content icons results in a display of further information about the content. In some cases, such as when a displayed content icon is a multi-list collection item, the collection list is displayed upon selection of the icon. For example, as shown, Display Icon 402D is a multi-list collection of Kate Bush albums. As such, the selection of Display Icon 402D results in the display of the expanded Multi-List Collection 406. Additional information can also be displayed to a participant depending on icon selections.

Figure 4B:
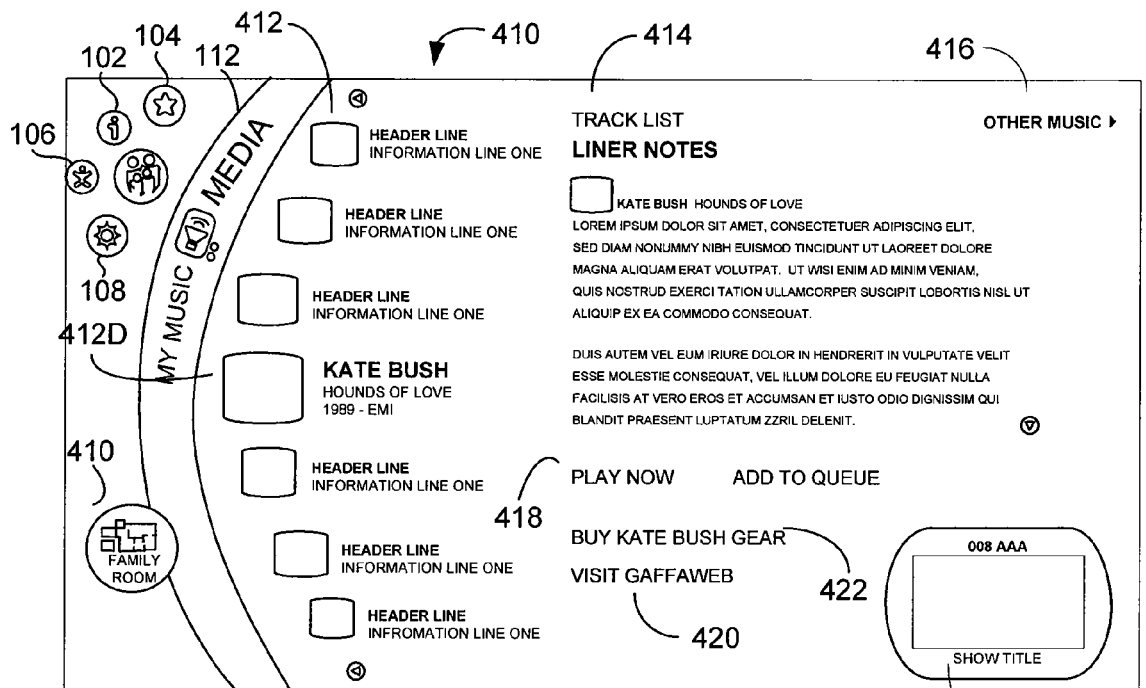
FIG. 4B is an illustrative screen display of a television user interface of music programs in a full screen mode showing program related information and placement of such information.

FIG. 4B illustrates a display that results from having a participant select one of the content icons within the Multi-List Collection 406 of FIG. 4A. In particular, the selection of Collection Icon 406A—Kate Bush album 'Hounds of Love', results in Display 410 of FIG. 4B.

Expanded Media Sphere 112 of FIG. 4B, includes Content Display Icons 412A-412G, other Music Icon 416, a Track List 414, a Liner Notes Section, a Play Now Icon 418, Related Links 420, 422 and a Picture-in-Picture (PIP) Area 408. As previously discussed, a user has the ability to choose any one of a number of musical content by selecting the associated Icon 412A-412G. In response to the selection, such as the displayed scenario where Content Icon 412D associated with singer Kate Bush has been selected, a Track List 414 and Liner Notes are displayed. The Track List 414 provides access to information about other songs that are available on the selected Kate Bush collection. The Liner Notes provide information about Kate Bush, the collection and other similar data.

The Play Icon 418 enables a user to begin experiencing the collection through any media that are available. Other links such as 'Buy Kate Bush Gear' Icon 422, provide a link to a related display. In this case, a site where a user could purchase Kate Bush items. In the case of the 'Visit gaffaweb' Icon 420 the user is redirected to the gaffaweb site.

As previously discussed, the PIP Area 408 displays the running TV show that the user was watching prior to selecting the Music Media Icon 112. In other words, while making future programming selections, the user's viewing or experience of another media content is not interrupted. As would be understood, the display and presentation of information within the media sphere can vary without departing from the scope of the present invention. Alternative displays containing similar information in the PC environment are shown in FIG. 4C and FIG. 4D.

Figure 4C:
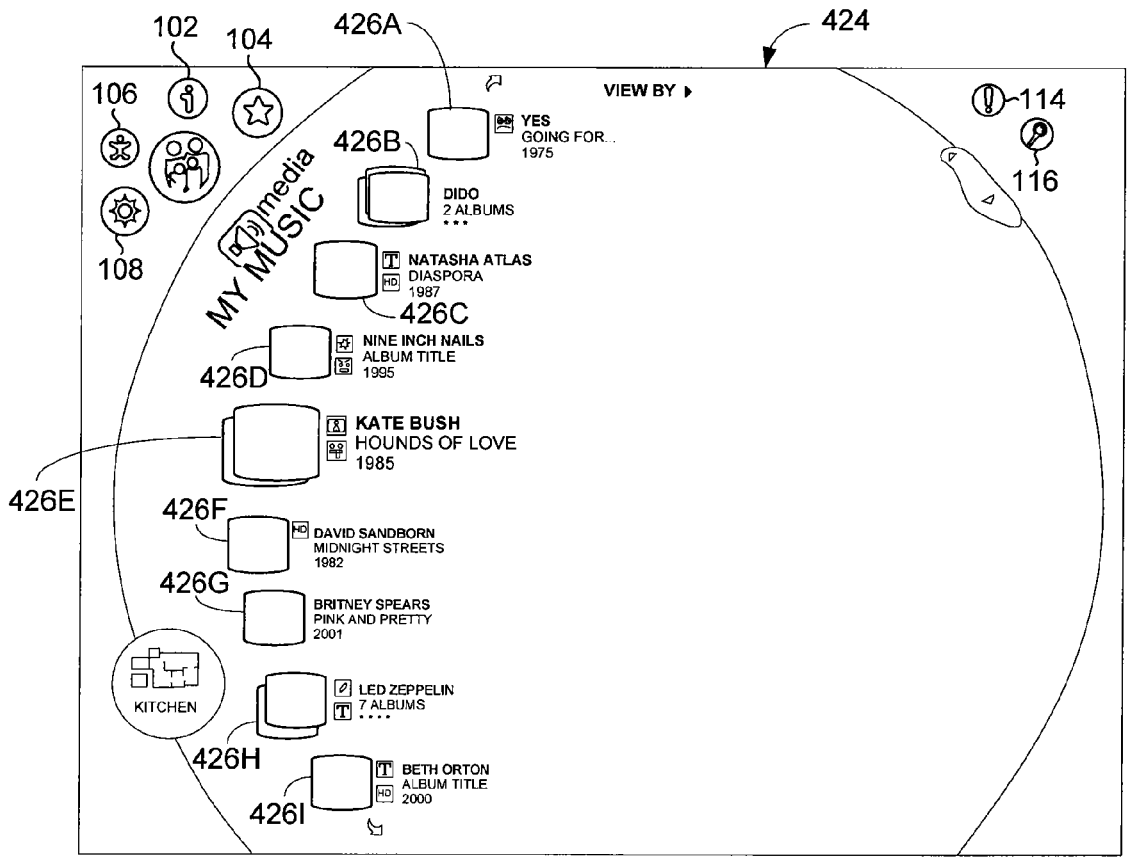
FIG. 4C is an illustrative screen display of a personal computer user interface of music programs and detailed information about an album.

The Display 424 of FIG. 4C is similar to that of FIG. 4A and offers the same options to a participant while also conveying information in a similar manner. In particular, Display 424 is a PC interface screen of an embodiment.

Figure 4D:
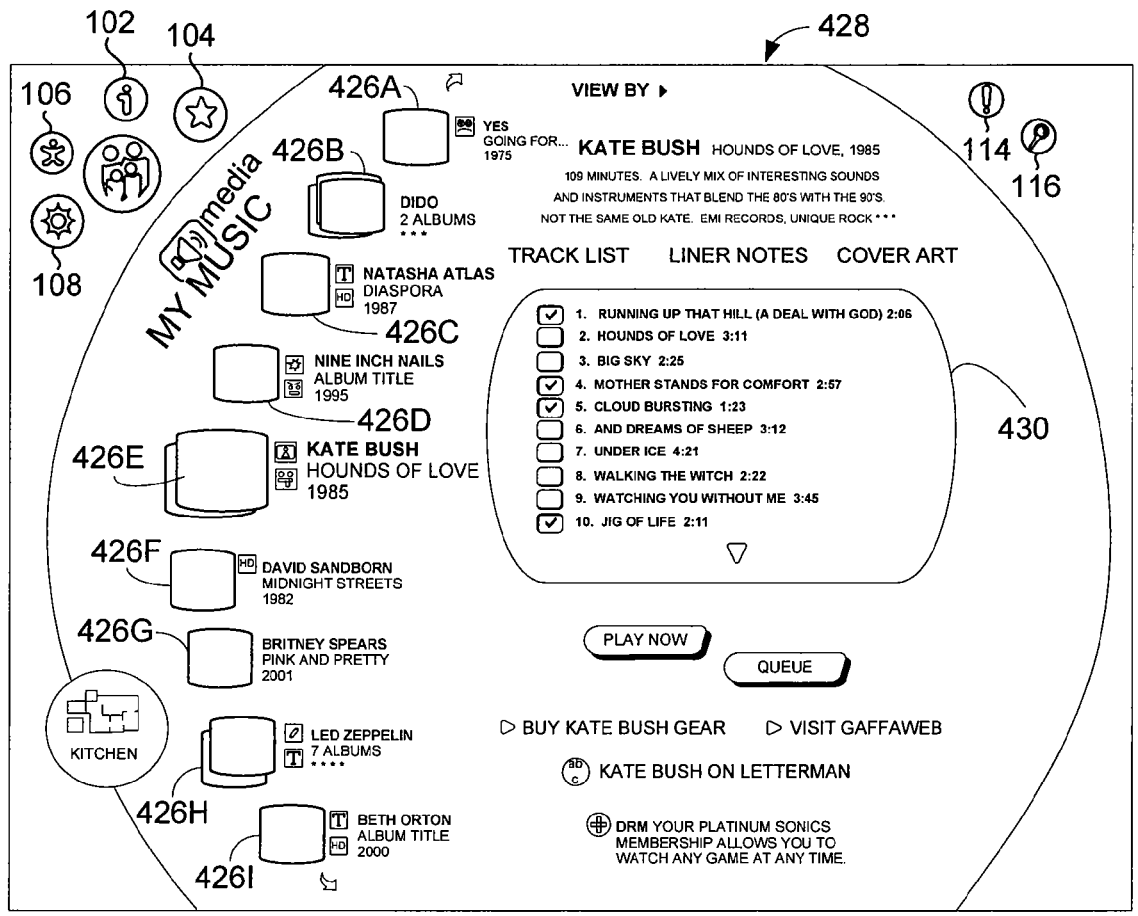
FIG. 4D is an illustrative screen display of a personal computer user interface of music programs in an alternate full screen mode showing program related information and placement of such information.

The Display 428 of FIG. 4D is similar to the Display 410 of FIG. 4B. In both Display 428 and 410, a participant's selection of the Kate Bush music media content—'Hounds of Love', results in a display of more detailed information regarding the album. In this embodiment of the present invention, information pertaining to the various tracks on the selected album are displayed, along with access to other related sites.

Having discussed exemplary visual aspects and user interaction of the present invention, along with the criteria for populating the display as discussed above, the advantages and benefits of the present invention should become apparent. The present invention provides content from a variety of sources in the form of a multi-dimensional display. The display conveys simultaneously, multiple pieces of information to the user regarding each of the displayed content. The displayed content results from the filtering, sorting and grouping functions of the present invention. Content is filtered, organized and presented based on specific levels of criteria as specified by participants. Preferences of the participant and things they care about are determined by combinations of definition attributes. These attributes may include but are not limited to previously recorded items, service providers, unique identifiers, digital history, time-date stamps, ownership, genre, recommended items, advertising agreements, media database store, who's listening/watching/participating, devices, persona and so on. The combined process of all three functions when applied, qualifies the options for content display and programming, to those choices that are most likely to be of interest to a participant.

As would be understood by those skilled in the art, the functions discussed herein can be performed on a client side, a server side or any combination of both. These functions could also be performed on any one or more computing devices, in a variety of combinations and configurations, and such variations are contemplated and within the scope of the present invention.

The present invention has been described in relation to particular embodiments which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated and within the scope of the claims.

We claim:

1. A method for the consolidated display and presentation of digital information for interaction by a participant, comprising:
   providing content items from a plurality of content sources, the content items including a set of community information that enables the participant to discover the presence of one or more other participants, at least two of said content sources having different media types, the media types including at least two of on-air, video, photos, music, games, and books;
   capturing said content items based at least in part on an historical preference associated with said participant, said historical preference based on at least one of an historical pattern of content access by said participant and a historical selection of content by said participant; and
   multi-dimensionally presenting at least one indicia of said content items and at least one piece of meta-data associated with one or more of said content items, said content items organized based upon said historical preference associated with said participant, for use by said participant, wherein said at least one piece of meta-data includes at least one piece of ancillary information associated with said content items.

2. A method as recited in claim 1, wherein said at least one indicia is selectable.

3. A method as recited in claim 2, wherein said at least one indicia is a pictorial representation of at least one of said content items.

4. A method as recited in claim 2, wherein said at least one indicia of the organized content items is representative of a collection of multiple content items.

5. A method as recited in claim 4, wherein said at least one indicia can be expanded to display and allow selection of indicia of individual content items included in said collection.

6. A method as recited in claim 2, further comprising:
   accepting a selection of a first indicia;
   if the selected first indicia is representative of a collection of multiple content items then displaying a plurality of selectable pictorial indicia representative of the content items comprising the collection; and
   if the selected first indicia is representative of a single content item then displaying additional information about the organized content item associated with said first indicia.

7. A method as recited in claim 1, wherein presenting meta-data further comprises presenting an indicia corresponding to the at least one piece of meta-data associated with the one or more content items.

8. A method as recited in claim 7, wherein said at least one piece of meta-data comprises a textual description of said one or more content items.

9. A method as recited in claim 7, wherein said at least one piece of meta-data is represented to the participant by at least one emoticon.

10. A method as recited in claim 1, wherein capturing said content items comprises at least one of filtering and grouping said content items.

11. A method as recited in claim 1, wherein each of said media types comprises at least one of digitally stored movies, music, books and video clips.

12. A system for organizing and selecting digital content information comprising:
   an input means for receiving selections from a participant;
   a multi-dimensional output device means for conveying multiple pieces of information relating to media content from a plurality of media sources, the media content including a set of community information that enables the participant to discover the presence of one or more other participants, at least two of said media sources having different media types, the media types including at least two of on-air, video, photos, music, games, and books;
   a configurable filter means; and
   a processing means;
   wherein said processing means is configured to accept selections from said input means and apply said configurable filter means to provide digital content information and associated meta-data to said participant through said multi-dimensional output device means, said associated meta-data including at least one piece of ancillary information associated with said digital content information, and
   wherein said configurable filter means is configured to capture digital content information at least in part on the basis of an historical preference associated with said participant, said historical preference based on at least one of an historical pattern of content access by said participant and a historical selection of content by said participant.

13. A system as recited in claim 12, wherein said multi-dimensional output device means is a visual display.

14. A system as recited in claim 13, wherein said display is a personal computer monitor.

15. A system as recited in claim 13, wherein said display is a television screen.

16. A system as recited in claim 12, wherein said multi-dimensional output device means presents content related information as an emoticon that is associated with said media content.

17. A system as recited in claim 12, wherein said multi-dimensional output device means presents meta-data relating to a content event.

18. A system as recited in claim 17, wherein said meta-data includes links to other information that is relevant to said content event.

19. A method for presenting digital content, comprising:
providing a selection of content items from a plurality of sources, the content items including a set of community information that enables the participant to discover the presence of one or more other participants, at least two of said sources having different media types, the media types including at least two of on-air, video, photos, music, games, and books;
grouping and sorting said content items at least in part on the basis of an historical preference associated with a user, said historical preference based on at least one of an historical pattern of content access by said user and a historical selection of content by said user; and
presenting said content items as icons, and presenting associated meta-data as emoticons, to convey multiple items of information relevant to said content items for selection by said user, wherein said associated meta-data includes at least one piece of ancillary information associated with said content items.

20. A computer readable medium having computer executable code for performing a method for presenting digital content, the method comprising:
providing a selection of content items from a plurality of sources, the content items including a set of community information that enables the participant to discover the presence of one or more other participants, at least two of said sources having different media types, the media types including at least two of on-air, video, photos, music, games, and books;
grouping and sorting said content items at least in part on the basis of an historical preference associated with a user, said historical preference based on at least one of an historical pattern of content access by said user and a historical selection of content by said user; and
presenting said content items as icons, and presenting associated meta-data as emoticons, to convey multiple items of information relevant to said content items for selection by said user, wherein said associated meta-data includes at least one piece of ancillary information associated with said content items.

21. A computer system having a processor, a memory and an operating environment, the computer system operable to execute a method for presenting digital content, the method comprising:
providing a selection of content items from a plurality of sources, the content items including a set of community information that enables the participant to discover the presence of one or more other participants, at least two of said sources having different media types, the media types including at least two of on-air, video, photos, music, games, and books;
grouping and sorting said content items at least in part on the basis of an historical preference associated with a user, said historical preference based on at least one of an historical pattern of content access by said user and a historical selection of content by said user; and
presenting said content items as icons, and presenting associated meta-data as emoticons, to convey multiple items of information relevant to said content items for selection by said user, wherein said associated meta-data includes at least one piece of ancillary information associated with said content items.

22. A computer readable medium having computer executable code for performing a method for the consolidated display and presentation of digital information for interaction by a participant, the method comprising:
providing a selection of content items from a plurality of sources, the content items including a set of community information that enables the participant to discover the presence of one or more other participants, at least two of said sources having different media types, the media types including at least two of on-air, video, photos, music, games, and books;
organizing said content items at least in part on the basis of an historical preference associated with said participant, said historical preference based on at least one of an historical pattern of content access by said participant and a historical selection of content by said participant; and
presenting the organized content items with at least one indicia of the content items and at least one piece of meta-data associated with at least one of said content items, for consumption or further use by said participant, wherein said associated meta-data includes at least one piece of ancillary information associated with said organized content items.

23. A computer system having a processor, a memory and an operating environment, the computer system operable to execute a method for the consolidated display and presentation of digital information for interaction by a participant, the method comprising:
providing a selection of content items from a plurality of sources, the content items including a set of community information that enables the participant to discover the presence of one or more other participants, at least two of said sources having different media types, the media types including at least two of on-air, video, photos, music, games, and books;
organizing said content items at least in part on the basis of an historical preference associated with said participant, said historical preference based on at least one of an historical pattern of content access by said participant and a historical selection of content by said participant; and
presenting the organized content items with at least one indicia of the content items and at least one piece of meta-data associated with at least one of said content items, for consumption or further use by said participant, wherein said associated meta-data includes at least one piece of ancillary information associated with said organized content items;
wherein the presented associated meta-data is an emoticon.

* * * * *

UNITED STATES PATENT AND TRADEMARK OFFICE
CERTIFICATE OF CORRECTION

| | | |
|---|---|---|
| PATENT NO. | : 7,363,591 B2 | Page 1 of 1 |
| APPLICATION NO. | : 10/348591 | |
| DATED | : April 22, 2008 | |
| INVENTOR(S) | : Flora Goldthwaite et al. | |

It is certified that error appears in the above-identified patent and that said Letters Patent is hereby corrected as shown below:

In column 6, line 63, delete "'our shows'Guide" and insert -- 'our shows' Guide --, therefor.

Signed and Sealed this
Nineteenth Day of July, 2011

David J. Kappos
*Director of the United States Patent and Trademark Office*